G. ZINSLI.
RESILIENT WHEEL.
APPLICATION FILED MAY 10, 1916.
1,244,822.
Patented Oct. 30, 1917.
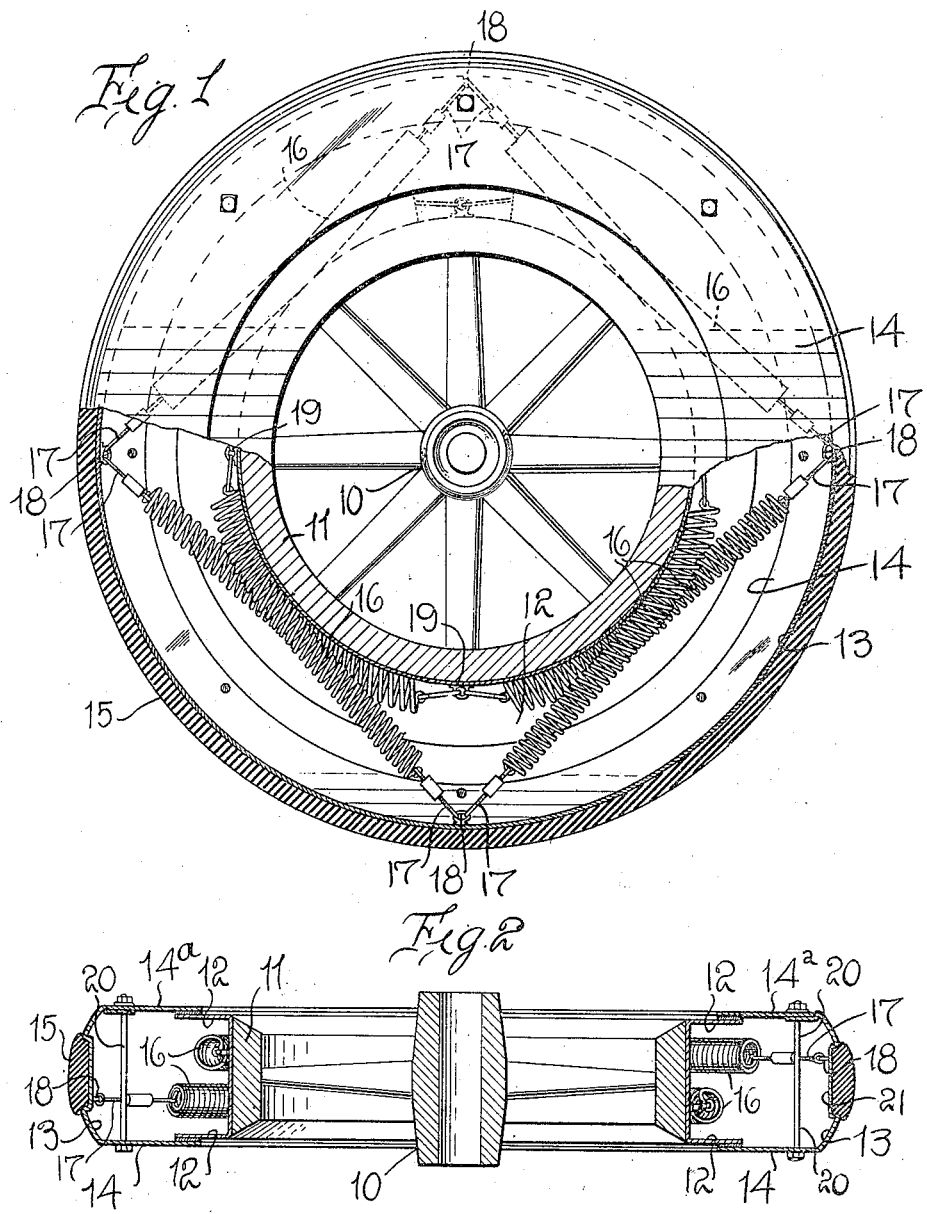
Inventor
GALLUS ZINSLI
By Watson E. Coleman
Attorney

UNITED STATES PATENT OFFICE.

GALLUS ZINSLI, OF WIBAUX, MONTANA.

RESILIENT WHEEL.

1,244,822.  Specification of Letters Patent.  Patented Oct. 30, 1917.

Application filed May 10, 1916. Serial No. 96,614.

*To all whom it may concern:*

Be it known that I, GALLUS ZINSLI, a citizen of the United States, residing at Wibaux, in the county of Wibaux and State of Montana, have invented certain new and useful Improvements in Resilient Wheels, of which the following is a specification, reference being had to the accompanying drawings.

This invention relates to resilient wheels of that type in which a hub section and a rim section are cushioned with respect to each other by means of springs acting as supports for the hub section with respect to the rim section, and the general object of my invention is the provision of a very simple wheel of this character having very few parts and in which not only is the wheel cushioned from radial shocks but the wheel is also cushioned against circumferential shocks.

A further object of the invention is to provide a construction of this character wherein the hub section is adapted to move in any direction relative to the rim section, this movement however being resisted by a plurality of pairs of coil springs embracing the hub section and supporting it in resilient slings as they may be termed.

Still another object of my invention is to provide means whereby the tension of the several springs may be regulated.

Other objects will appear in the course of the following description.

This invention is illustrated in the accompanying drawings wherein;

Figure 1 is a side elevation of a wheel constructed in accordance with my invention, the lower half of the wheel being in section, and the springs being in elevation;

Fig. 2 is a transverse diametrical section of the wheel.

Referring to these figures 10 designates a hub section comprising an inner rim 11 having outwardly projecting parallel flanges 12. This hub section is adapted to be secured to or formed as a part of the hub of the wheel and be either connected to or rotatable upon the axle skein in any suitable manner. Disposed normally in concentric relation to the inner rim 11, is a rim 13 having laterally disposed inwardly projecting flanges 14 and 14ᵃ which overlap the flanges 12. The rim 13 may carry any suitable tire, but I have shown the rim 13 as provided with a solid hard rubber tire 15. I do not wish, however, to be limited to this as it is obvious that many different forms of tire may be used in connection with my improved wheel.

For the purpose of resiliently supporting the hub section relative to the rim section, I provide a plurality of pairs of coiled extensible springs 16 each pair of springs embracing the inner rim 11 and resting thereagainst, the ends of the springs being converged and operatively connected to a single point upon the rim 13, the point of attachment for the ends of one pair of springs being diametrically disposed to the point of attachment of the outer ends of the other pair of springs. Preferably the extremities of the springs 16 are connected by links 17 to eyes 18 formed upon the inner face of the rim 13, and preferably the link 17 has a turn buckle connected to these eyes so that the springs 16 may be expanded to a greater or less degree. Each of the springs 16 is connected to the inner rim 11 at one end by any suitable means as, for instance, an eye 19 and a link, the eye 19 serving for the attachment of two links.

Any number of pairs of springs 16 may be used but for the sake of simplicity in the drawing, I have only shown eight of these springs and their connections. The springs, of course are disposed in quartering relation to each other, where only four pairs of springs are used. In other words each pair of springs extends in a different angular direction from any other pair of springs.

As illustrated most clearly in Fig. 2, I prefer to form the rim 13 of sheet metal having an integral flange 14 on one side and having a removable flange 14ᵃ on the opposite side held in place by means of the bolts 20. The rim is preferably formed with a depressed medial portion 21 within which is disposed the tread or tire 15.

With the construction described, the hub is supported in extensible and contractible slings as it were, the springs 16 permitting the hub to shift in any radial direction relative to the rim, but at all times resiliently sustaining the hub in relation to the rim, and at all times urging the hub to a central position relative to the rim. Not only is the hub and rim supported against radial shocks, but it will be seen that a relative rotation of the hub and rim is yieldingly resisted by the springs because of the fact that the hub is connected to each spring 16 at one end so that if the hub and rim are relatively rotated such rotation will expand one spring of each pair. Lateral stresses are resisted of course by the overlapping engagement of the flanges 14 and 14ᵃ with the flanges 12. The flange 14ᵃ is adapted to be removably connected to the rim and the opposite flange, as by means of bolts 20. By removing the flange 14ᵃ access may be had to the interior of the wheel, and the spring may be disconnected from the rim so that the hub may be taken out from its position within the rim.

My wheel constructed in accordance with the above description will effectively cushion a jar or shock communicated to the wheel, and wheels of this character may be used in place of wheels for pneumatic or cushion tires of rubber such as are now in use for automobiles. My improved wheel may be very cheaply made because of its simplicity, and it is obvious that it will outlast the ordinary pneumatic rubber tires.

The rim sections 14 and 14ᵃ are preferably to be lined with leather or other like substance on the inside, this leather overlapping the flanges 12 and preventing the rattling of the flanges or any noise made by the flanges operating against the inner faces of the rim sections.

Having described my invention what I claim is:

1. In a cushioned wheel, a central section including an annular member flanged at its ends, and an outer rim section having inwardly directed flanges overlapping the flanges of the central section, a plurality of pairs of coiled springs, each pair having their adjacent ends operatively conjoined and connected to the central section, each pair together embracing a portion of the central section and extending partially around the central section in opposite directions, links attached to the outer ends of the springs, the links of each pair of springs being attached to diametrically opposite portions of the rim, and means for increasing or decreasing the tension of the springs.

2. In a cushioned wheel, the combination with an annular central section and an annular rim section spaced therefrom, of a plurality of pairs of coiled contractile springs, the springs of each pair being operatively connected at their adjacent ends to the central section and extending in opposite directions on opposite sides of and partially embracing the annular central section and being attached at diametrically opposite points to the rim section, each of said springs for a portion of its length fitting against and conforming in curvature to the curvature of the central section, said plurality of pairs of springs together engaging the central section at relative spaced points and together supporting said central section.

3. In a cushioned wheel, a central annular section and an outer annular rim section, a plurality of sets of springs disposed around the central section, one set of springs being disposed in laterally spaced relation to the other set of springs, each set of springs comprising a plurality of pairs of springs, the adjacent ends of each pair of springs being operatively connected to each other and to said central section, the outer ends of each pair of springs being connected to the rim section at diametrically opposite points, the adjacent portions of each pair of springs contacting with and conforming to the curvature of the annular central section.

4. In a cushioned wheel, a central annular section and an outer concentric section, and coiled contractile springs arranged at intervals between the inner section and the outer section, the inner portions of the springs being attached to, bearing against and conforming in curvature to the periphery of the inner section of the wheel, the outer portions of the springs extending tangentially outward and being attached to the outer section.

In testimony whereof I hereunto affix my signature in the presence of two witnesses.

GALLUS ZINSLI.

Witnesses:
L. C. FALTERMEYER,
T. J. LYNCH.

Copies of this patent may be obtained for five cents each, by addressing the "Commissioner of Patents, Washington, D. C."